United States Patent

Webb et al.

[11] Patent Number: 5,818,959
[45] Date of Patent: Oct. 6, 1998

[54] METHOD OF PRODUCING A THREE-DIMENSIONAL IMAGE FROM TWO-DIMENSIONAL IMAGES

[75] Inventors: Jon A. Webb, Pittsburgh; C. Lawrence Zitnick, York, both of Pa.

[73] Assignee: Visual Interface, Inc., Pittsburg, Pa.

[21] Appl. No.: 539,307

[22] Filed: Oct. 4, 1995

[51] Int. Cl.⁶ .................................................. G06K 9/00
[52] U.S. Cl. .......................... 382/154; 382/106; 348/47; 356/12
[58] Field of Search ..................................... 382/106, 107, 382/108, 154, 285; 348/42, 47, 48, 126; 356/237, 376.2, 394, 396, 12; 250/358.1, 558; 364/556, 560, 564, 514 R; 395/119–121; H94N 13/02

[56] References Cited

U.S. PATENT DOCUMENTS

| 4,654,872 | 3/1987 | Hisano et al. ........................... 382/154 |
| 4,825,393 | 4/1989 | Nishiya ................................... 364/560 |
| 4,982,438 | 1/1991 | Usami et al. ............................ 382/154 |
| 5,432,712 | 7/1995 | Chan ....................................... 382/199 |
| 5,475,422 | 12/1995 | Mori et al. .................................. 384/48 |
| 5,561,526 | 10/1996 | Huber et al. ............................. 356/376 |
| 5,577,130 | 11/1996 | Wu .......................................... 382/106 |

FOREIGN PATENT DOCUMENTS 0 631250A2  6/1994  European Pat. Off. .

OTHER PUBLICATIONS

Minoru Maruyama, et al, *Range Sensing by Projecting Multiple Slits with Random Cuts*, IEEE Transactions on Pattern Analysis and Machine Intelligence, Jun. 1993, vol. 15, No. 15, No. 6, pp. 647–651.

P. Fua, *Reconstructing Complex Surfaces from Multiple Stereo Views*, 1995, International Conference on Computer Vision, Cambridge, MA. pp. 1078–1085.

Thomas Fromherz and Michael Bichsel, *Multiple Depth and Normal Maps for Shape from Multiple Views and Visual Cues*, Mar. 22–24, 1995, IAPRS, vol. 30, Part 5W1, ISPRS Intercommission Workshop "From Pixels to Sequences", Zurich, Switzerland 9 pages.

Brochure, *Introducing The Worlds First Whole Body 3D Scanner*, Cyberware, publication date unknown.

*Primary Examiner*—Christopher S. Kelley
*Attorney, Agent, or Firm*—Morgan, Lewis & Bockius LLP

[57] ABSTRACT

A method of constructing a three-dimensional image from a plurality of two-dimensional images is comprised of the steps of selecting one of the images to be a reference image and selecting a second image. One or more points in the second image are identified as possible match points for each point in the reference image. The other images are used to verify the possible match points found in the second image. The projections of the possible match points are grouped into three-dimensional regions, and the regions are projected onto the reference image for the purpose of identifying false regions. The false region are eliminated and a three-dimensional image is constructed by combining the remaining regions.

21 Claims, 9 Drawing Sheets

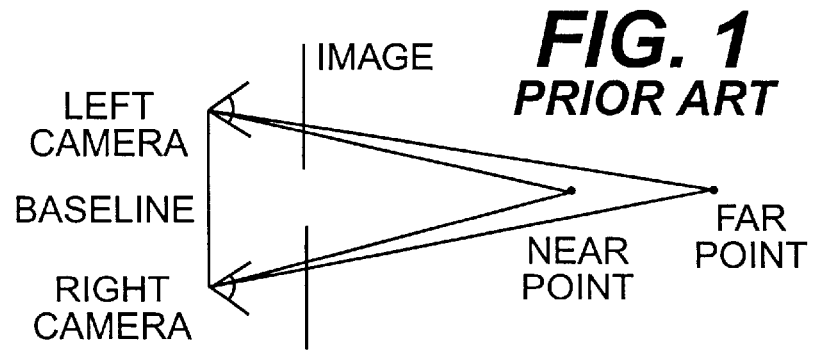
FIG. 1 PRIOR ART
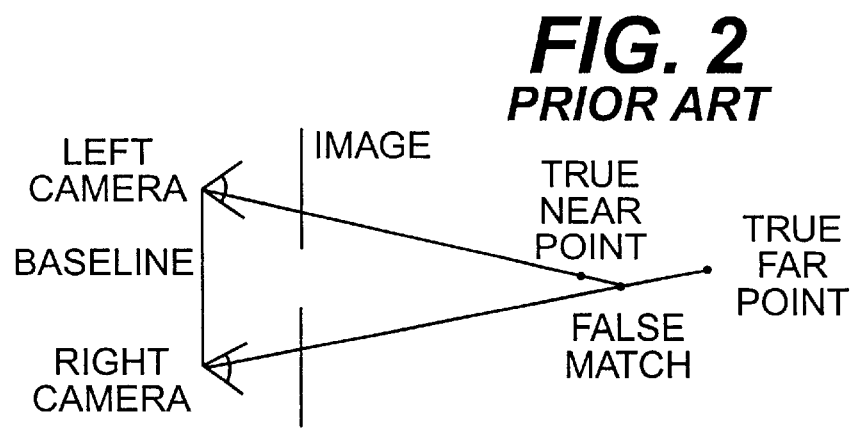
FIG. 2 PRIOR ART
FIG. 3 PRIOR ART
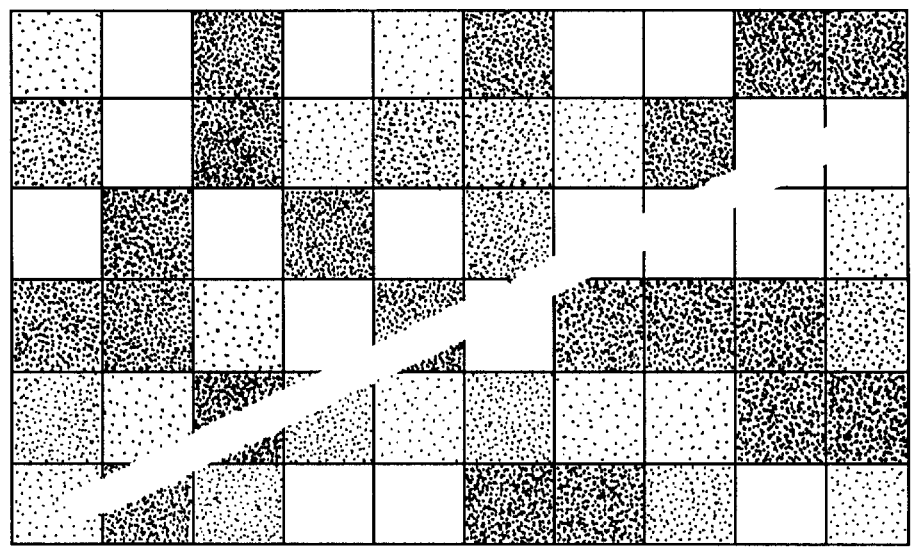

METHOD OF PRODUCING A THREE-DIMENSIONAL IMAGE FROM TWO-DIMENSIONAL IMAGES

BACKGROUND OF THE INVENTION

1. Field of the Invention

The present invention is directed broadly to imaging systems and more particularly to three-dimensional imaging systems.

2. Description of the Background

Stereo vision is a classic method for the recovery of depth information from images. It has been known for centuries that humans and other animals see in depth, in part, by comparing the images from their two eyes. The geometry fundamental to that process is shown in FIG. 1. In FIG. 1, both the left and right cameras see the same two points, labeled near point and far point. For both points, a triangle is formed with one side of the triangle being the camera baseline, which is assumed to be known, and the two rays from the camera optical centers to the point in space forming the other two sides. Because the position of the points on the camera images is known, the position of the point in depth is calculated by simply extending the rays through the image points until they intersect in space. That intersection point is the three-dimensional coordinate of the point from the image.

The information that must be known for that process to work includes:

which point on the left image corresponds to which point on the right image. That is known as the correspondence problem.

the camera characteristics, i.e., their focal lengths, relative placement, etc. That is known as the calibration problem.

Neither of those problems is especially easy to solve. Correspondence is difficult because many images contain repetitive textures, which do not usually confuse humans because we have so much other information we can apply, but which easily confuse computers. Calibration is not conceptually hard, but it is technically difficult because it must be performed to great accuracy to produce reliable results.

The consequences of an error in correspondence or calibration can be severe. Suppose a mistake in correspondence is made in the example of FIG. 1 and the image of the far point in the right image is mistakenly identified as being the image of the near point in the left image. The result is shown in FIG. 2. Neither the true near point nor the true far point is found, but instead a false point is seen. On the other hand, calibration errors can lead to distortions of the images in depth. For example, if the baseline distance is actually less than what it is measured to be, the entire image will be stretched in depth compared to reality. Because the calibration problem can be solved by measuring the camera characteristics precisely by various means, it is the correspondence problem that typically causes greater problems.

Consider the problem of finding the match for a point in the left image, say the near point in FIG. 2. Because the correct depth for the point is not known, the ray through this point in the left image must be searched. That ray projects onto a line, called the epipolar line, in the right image. The image of that line will appear as shown in FIG. 3. Because the intensity of the pixel from the left image is known, the epipolar line can be searched for a pixel of the same intensity in the right image. That assumes the point in space has the same appearance to both cameras, which implicitly assumes that the object does not have a mirror-like finish. (It is for that reason that stereo algorithms known in the art fail for shiny metallic surfaces.) The search will identify several possible match points. The correct match points must be properly chosen or a mistake, possibly a severe mistake, in recovering depth will be made.

There are several prior art methods for attempting to make the right choice. First, if the cameras are placed closer together, the baseline is reduced for a fixed depth range. Because the baseline is shorter, there is less potential for the line to intersect a false match. The problem with that approach is that the accuracy is also reduced because the triangle formed by the camera optical centers and the point in space becomes narrow. As a result, a small error in estimating the match position leads to a larger error in depth estimation.

A second prior art technique is to match a region rather than an individual pixel. For example, a small rectangle around each pixel from the left image may be the region for which a match in the right image is sought. The chances of a false match are reduced because the chance that N-pixels match is 1/N the chance that one pixel matches, assuming independence. The problem with that approach is that it must be assumed that the points in space are aligned in the same way in both images. That is, if the baseline distance between the cameras is large, the rectangle from the left image might project onto a parallelogram in the right image. The shape of the parallelogram is unknown because it depends on the normal of the surface in space, as well as its position. As a result, the correct pixels to examine cannot be identified in the right image to find the rectangle from the left image. That effect is negligible when looking at surfaces that are presented frontally to the viewer, but becomes more and more pronounced as surfaces bend away from the viewer and at object boundaries where the rectangle from the left image might contain points at widely different depths. Prior art stereo techniques based on that approach tend to behave very poorly at object boundaries.

Another prior art approach is to attempt to identify significant features in one image, for example edges, which can be searched for in the other image. That approach is somewhat similar to region matching, but it suffers less from the problems mentioned above because features can be chosen that will tend to look the same over a wide range of points of view. The problem with that approach, however, is that it leads to sparse depth, because many surfaces, particularly manmade ones, do not have a lot of features to be identified.

One of the most promising techniques is to use multiple cameras. If matches in multiple images are sought, the chance of a false match can be reduced in proportion to the number of cameras used. The chance of a false match with N+1 cameras is 1/N the chance of a false match with two cameras. However, given the enormous number of pixels being matched, false matches sill occur, and matching is computationally expensive. Thus, the need exists for a method of producing a three-dimensional image from multiple two-dimensional images produced by multiple cameras in a manner which is highly reliable and accurate, and which reduces the time and computational resources needed to identify the proper matches.

SUMMARY OF THE INVENTION

The present invention is directed to a method of constructing a three-dimensional image from at least two two-dimensional images. The method is comprised of the steps of selecting one of the images to be a reference image. One or more points in the other image are identified as possible match points for each point in the reference image. The projections of matching points are grouped into three-dimensional regions, and the regions are projected onto the reference image for the purpose of identifying false regions. The false regions are eliminated and a three-dimensional image is constructed using the correct regions.

By projecting the regions onto the reference image, the shortcomings found in prior art systems can be overcome. By looking at entire regions, rather than individual pixels or arbitrary areas such as squares, the ability to identify and eliminate false matches is greatly enhanced. The remaining regions are more likely to represent true match points, thereby providing an accurate three-dimensional reconstruction from the two two-dimensional images.

In accordance with one embodiment of the present invention, additional cameras may be used to produce additional two-dimensional images. The additional two-dimensional images may be used to eliminate certain of the possible matches before the remaining matches are connected together to form the three-dimensional regions. The more information which is available, the greater the likelihood that a correct three-dimensional image will be reconstructed, and the greater the accuracy of the resulting three-dimensional image.

According to another embodiment of the present invention, after the method has been practiced, each pixel in the reference image has match points in the other images. Based on that information, the intensity value for each pixel and all of its matches in the other images is normalized and the process is repeated to improve the accuracy of the reconstructed three-dimensional image.

The present invention overcomes many of the problems associated with the prior art and results in improved accuracy and reliability of the reconstructed, three-dimensional image. The method of the present invention may be implemented in software in such a manner that computational resources are minimized and the time required for processing of an image reduced to minutes rather than hours. In addition, the hardware needed to produce the two-dimensional images is commercially available and relatively low-cost. It is anticipated that a system for carrying out the method of the present invention can be constructed for on the order of hundreds to thousands of dollars which is to be contrasted with current state of the art three-dimensional imaging systems which cost on the order of tens of thousands to hundreds of thousands of dollars. The present invention, therefore, represents a dramatic leap forward in placing the ability to reconstruct three-dimensional images from two-dimensional images at a cost level which is accessible to anyone owning a personal computer. Those, and other advantages and benefits of the present invention will become apparent from the Description Of The Preferred Embodiments hereinbelow.

BRIEF DESCRIPTION OF THE DRAWINGS

For the present invention to be clearly understood and readily practiced, the present invention will be described in conjunction with the following figures wherein:

FIG. 1 illustrates the geometry for extracting depth information from the same point in two images;

FIG. 2 illustrates the error that will occur if the far point in the right image of FIG. 1 is mistakenly identified as being the image of the near point in the left image:

FIG. 3 illustrates an epipolar line;

DESCRIPTION OF THE PREFERRED EMBODIMENTS

Figure 4:
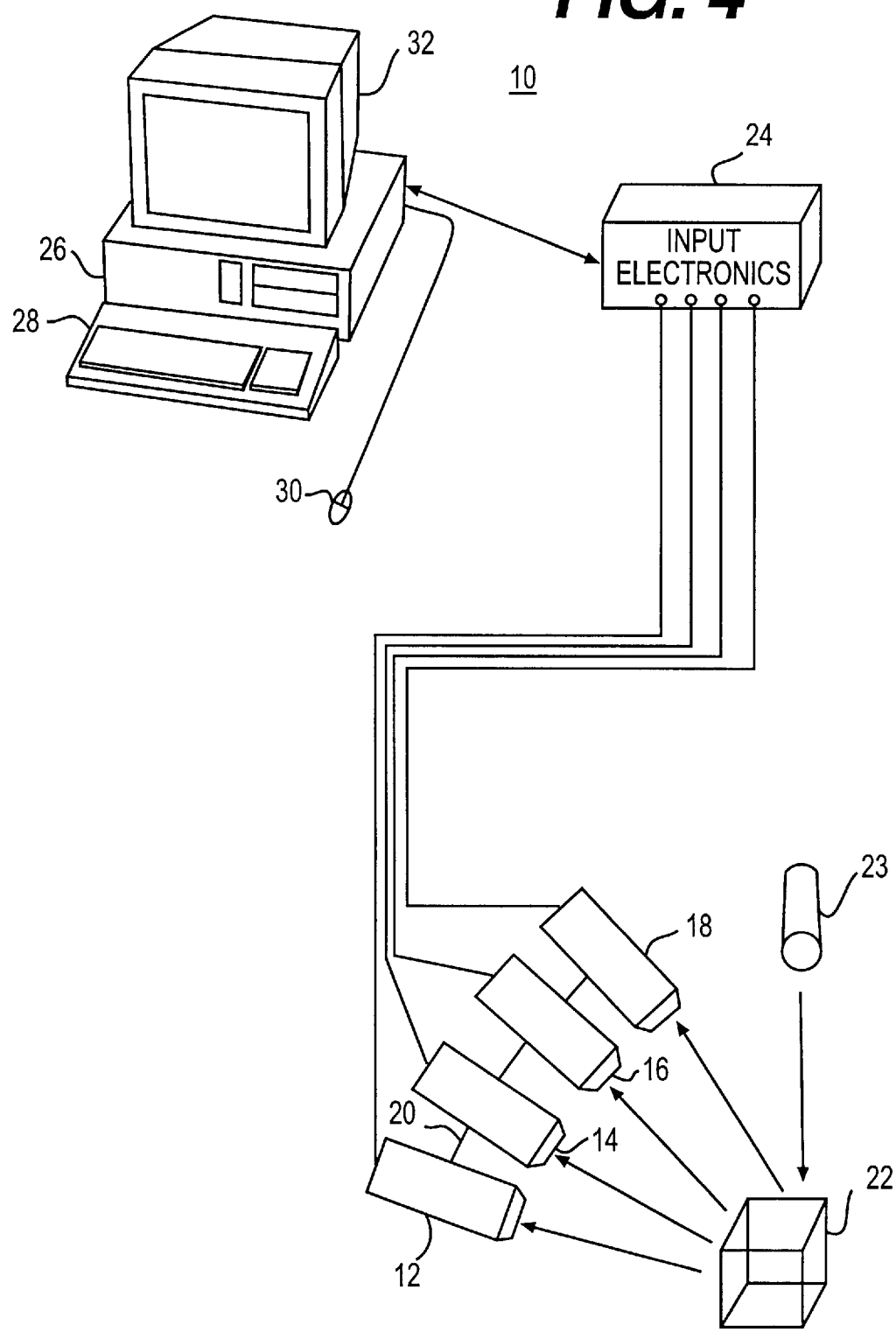
FIG. 4 illustrates an apparatus for carrying out the method of the present invention.

FIG. 4 illustrates an apparatus 10 for carrying out the method of the present invention. In FIG. 4, the apparatus 10 of the present invention may be comprised of N-cameras. In FIG. 4, four cameras 12, 14, 16, 18 are illustrated. The cameras are connected to a bar or member 20 which allows the cameras 12, 14, 16, 18 to be focused on a workspace 22 while being horizontally displaced from one another. The horizontal position of each camera relative to all of the other cameras may be adjusted, and bar 20 is provided with appropriate mechanical attachments (not shown) to provide for such positioning of the cameras. Typically, cameras 14 and 16 will be positioned closest together, and one of those two cameras will be selected as the reference camera. In the current embodiment the cameras are placed about two thirds of a meter apart in total, and are positioned to converge on the workspace 22 which is approximately 0.5 m by 0.5 m by 0.5 m. A light 23 or other means of projecting a striped pattern into the workspace 22 is provided for reasons to be explained later. The light is normally positioned behind or adjacent to the reference camera, and is shown separately in FIG. 4 for purposes of clarity.

Figure 5:
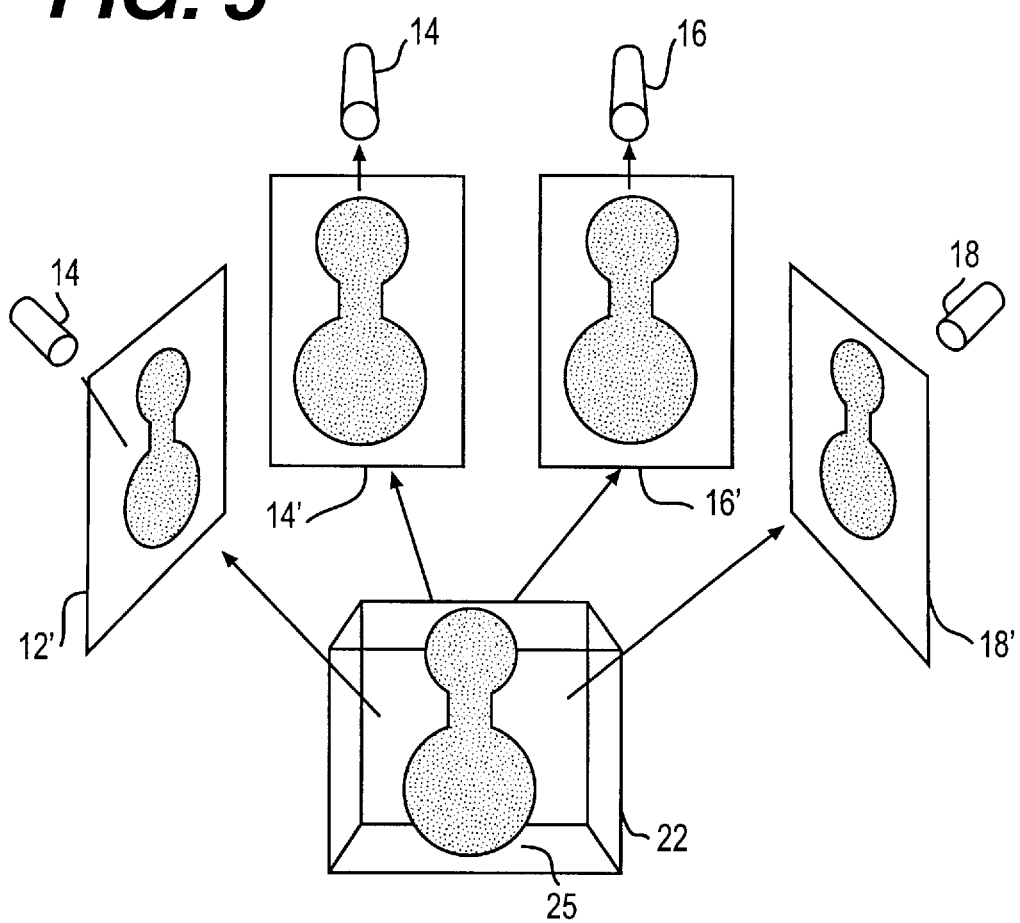
FIG. 5 illustrates four images produced by four cameras focused on a three-dimensional object in the workspace.

As shown in FIG. 5, the cameras 12, 14, 16, 18 produce images 12', 14' 16', 18', respectively, of a three-dimensional object 25 which is placed in workspace 22. Each of the cameras 12, 14, 16, 18, has a slightly different view of the object in workspace 22 such that each of the images 12', 14', 16', 18' is a slightly different two-dimensional image of the three-dimensional object 25. As shown in FIG. 4, each two-dimensional image is captured by input electronics 24. Input electronics 24 may be any combination of known devices capable of receiving images from the cameras 12, 14, 16, 18. The precise construction of input electronics 24 depends on the type of cameras used. For example, inexpensive analog cameras would require analog to digital converters, or a single analog to digital converter which is operated in a multiplexed manner so as to sequentially handle images produced by the cameras 12, 14, 16, 18. The purpose of the input electronics 24 is to provide at least two, two-dimensional images of the three-dimensional object 25 contained in workspace 22. Those images are digitized and provided to a computer 26. Those of ordinary skill in the art will recognize that a wide variety of inexpensive cameras 12, 14, 16, 18 may be provided with appropriate input electronics 24 to provide computer 26 with at least two, two-dimensional images, in digital form, of the three-dimensional object 25 in workspace 22.

Computer 26 may be connected to typical types of input devices such as a keyboard 28 and a mouse 30. The computer 26 is also connected in a known manner to an output device 32 such as a display. In the preferred embodiment, the method of the present invention is embodied in software which is stored and executed within computer 26.

Figure 6:
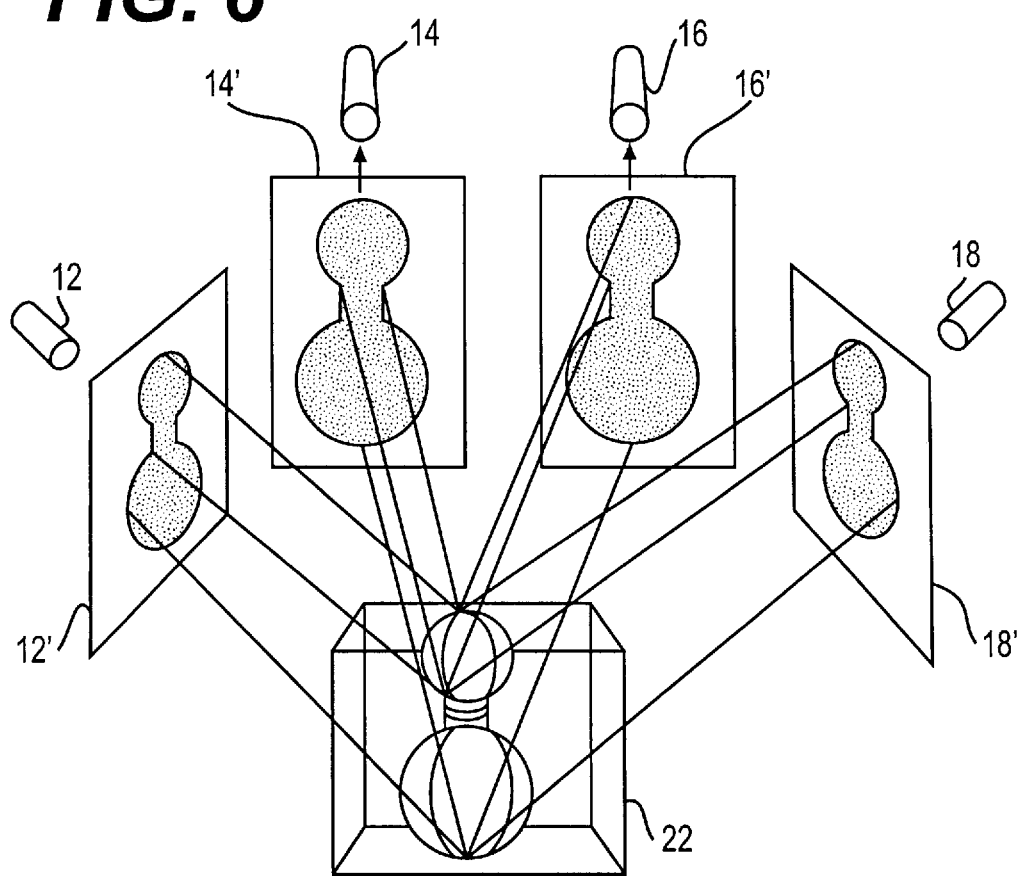
FIG. 6 illustrates the workspace with each of the four images projected into it.

Returning to FIG. 5, conventional stereo imaging techniques would compare images 12', 14', 16', 18' using correlation techniques, feature-matching, or other techniques to reconstruct the object's shape. In the present invention, as shown in FIG. 6, instead of comparing the images 12', 14', 16', 18' directly, they are re-projected into the workspace 22. As a result, each element or "voxel" of the workspace receives multiple values, one from each camera. The number of voxels W is based on the desired resolution of the reconstruction. For reconstructions useful for engineering purposes, resolution will likely need to be on the order of mils; for reconstructions useful for cosmetic surgery, resolution will likely need to be on the order of millimeters.

Assuming the object 25 is set against a textured background, there are only three possibilities for the values seen in each voxel:

1. they are equal, or nearly so, which means the voxel is the surface of some object;
2. some of the values are equal, or nearly so, and others differ greatly, which means the voxel is the surface of an object, but is not visible to all cameras, or there is an accidental alignment of similar object features; or
3. they all differ greatly, which means the voxel is not the surface of any object.

The problem with the foregoing approach is that it is computationally demanding. If N is the number of images, M is the resolution of image, and W the resolution of the workspace, projecting each image into every voxel of the workspace and searching the workspace for connected regions to find the surfaces takes on the order of $N*M^2*W^3$ time. For example, with sixteen images of 512×512 resolution and a 1024×1024×1024 workspace, $2^{52}$ updates would have to be performed. Even if the updates could be done at 200 MHz with a supercomputer it would still take $2^{52}/200,000,000=225179981.37$ seconds or 2606.25 days. That is unacceptably slow. Although various methods can be used to significantly speed up the computation, the approach of the present invention is to limit searching the workspace to those areas in which the object surfaces are likely to exist. The method of the present invention works in three phases:

locate possible surface points using nearby cameras by calculation in the image domain;

verify surface points using distant cameras; and apply an opaque surfaces constraint to extract surface regions.

Figure 7:
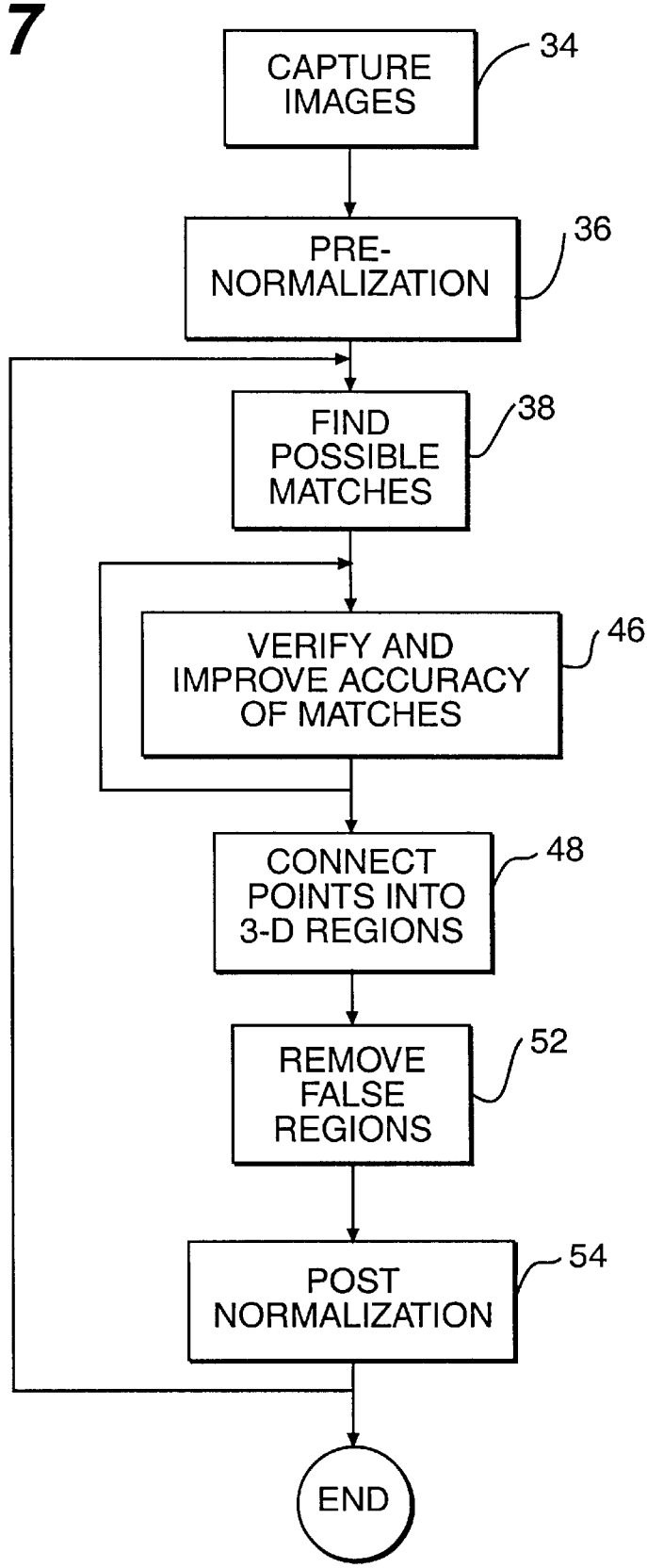
FIG. 7 is a high level flow chart illustrating the method of the present invention.

FIG. 7 is a high level flowchart illustrating the method of the present invention. In FIG. 7, the first step, step 34 is to capture the necessary images of the three-dimensional article. That is performed by the input electronics 24 operated in conjunction with cameras 12, 14, 16, 18 and light source 23. Data could also be pre-recorded onto videotape machines attached to the camera so long as a timing signal is provided to allow the corresponding frames to be determined.

The next step in the process is pre-normalization step 36. Because the dominant image feature in each of the images is the pattern projected by light source 23, the underlying image value may be approximated independently of the vantage point of each camera. A normalized image value at each pixel may be calculated by comparing each pixel with the peaks and valleys in the projected pattern. The process then continues with step 38 in which possible matches are determined.

In prior art methods, matching points are found by searching along the epipolar line of the type illustrated in FIG. 3. The "correct" match is found by minimizing a function along that line. The problem with that approach is that even with the methods found in the prior art for making the "right choice", false matches are still found and further processing is required to remove those errors. That extra processing tends to introduce numerous assumptions which reduce reliability and increase computational time. The basic problem with the prior art approaches is that they all concentrate exclusively in terms of the image. There is no way, in general, of determining the correct match for a pixel purely by looking at the image, and thinking in the image domain.

Figure 8:
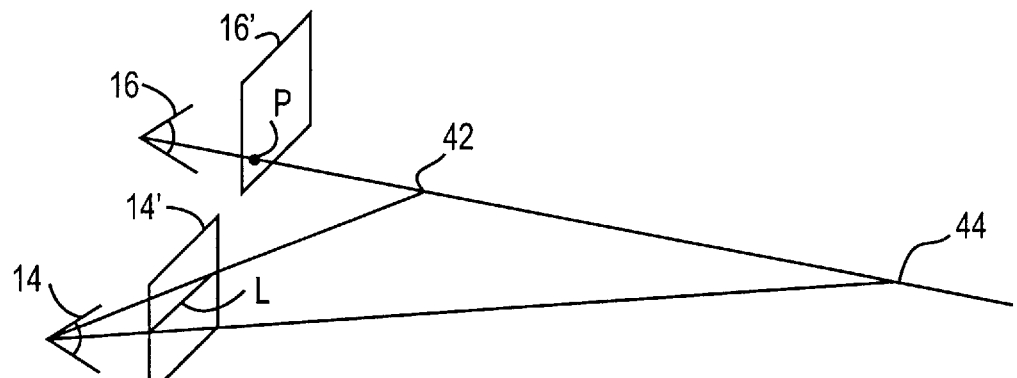
FIG. 8 illustrates how a point in an image from one camera projects onto a line in an image from another camera.

Assume in FIG. 8 that camera 16 is the reference camera and that image 16' is the reference image. Under perspective projection, each pixel P from image 16' projects onto a line L in image 14'. That is because the depth is unknown such that the matching pixel for pixel P can fall anywhere along line L. For cameras which are physically close together as are cameras 14 and 16, the number of pixels that the line L crosses in the image 14' is smaller than the number of voxels that the line segment defined by points 42 and 44 crosses in the workspace. That is because the view points and optical axes of the cameras 14, 16 are similar so that the line L projected from the reference camera 16 is greatly foreshortened in camera 14's view. As a result, time can be saved by looking for matching pixels for pixel P along the line L by searching in the image space, rather than in the workspace. The cameras 14 and 16 are selected for use at step 38 not only because epipolar lines for nearby cameras tend to be relatively short, but objects generally look very similar from nearby points of view thereby increasing the likelihood that a true match will not be rejected as a result of a shift in appearance resulting from a change in the point of view.

Figure 9:
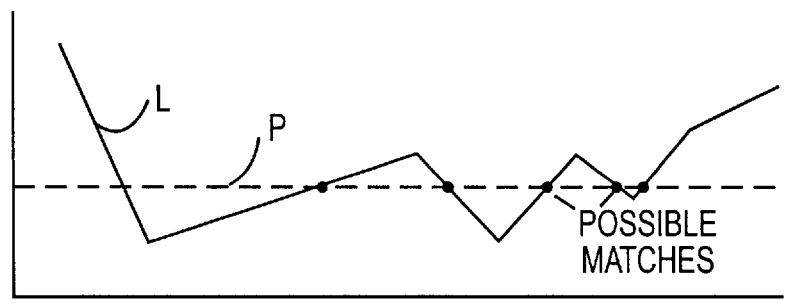
FIG. 9 illustrates a series of ramps obtained by applying a bipolar interpolation technique to calculate the values along an epipolar line.

Line L is an epipolar line of the type illustrated in FIG. 3. Because of the discrete nature of the image 14', its values must be calculated by interpolation. Using a simple yet effective technique of interpolation, like bilinear interpolation, the value calculated along line L will look like a series of linear ramps as shown in FIG. 9. Higher order interpolation can be used which makes the structure of L somewhat more complicated, but the performance as described below remains of the same order.

The image space is searched by finding the intersection points of the linear ramps of L shown in FIG. 9 with the constant line at the value for pixel P from the reference image 16'. Half of those intersection points can be eliminated by including the sign of the gradient at the intersection with the value for P. The result is a collection of possible match points for the pixel P which must then be verified to eliminate false matches. In the current embodiment, typically four false matches are found for each pixel in the reference image 16'.

The rays through the reference pixel and the possible match pixels are then projected into three-dimensional space, and the intersection points are the three-dimensional coordinates of the possible matches. A list of all possible matches for each reference pixel is created which is the output of step 38. Pseudo-code representative of step 38 is found in Table No. 1.

TABLE NO. 1

Intensity (c,p) is the intensity (pixel, value) for the camera c at position "p".
Find_possible_3D_points (c Min_pt, Max_pt, ref_intensity_val)
1.   $(u_1v_1)$=project_3Dpt_to_image (c, Min_pt)
2.   $(u_2v_2)$=project_3Dpt_to_image (c, Max_pt)
3.   For every two neighboring points, p' and p", along the epipolar line segment from $(u_1v_1)$ to $(u_2v_2)$.
        {
        1.   If the ref_intensity_value is between intensity (c, p') and intensity (c, p")
            {
            1.   Interpolate between p' and p" to find the exact point $(u_3v_3)$, which has value = ref_intensity_val
            2.   Project $(u_3v_3)$ into 3D space, to create line L.
            3.   Find 3D point, P, where L intersects line created by Min_pt and Max_pt.
            4.   Add P to the list of possible points, ListP.
            }
        }
4.   Return ListP.

The process for locating the possible matches can be performed in a time proportional to the number of pixels in the projection of the line L on image 14'. The time needed to perform step 38 is on the order of $C*N^2*T$, where C is the number of cameras included in the local set (which is two in our example of FIG. 8), N is the image resolution required by the user, and T is the number of pixels that the line L maps onto.

Returning to FIG. 7, the next step in the process, step 46, is to verify and improve the accuracy of the matches found at step 38. That is accomplished by comparing the image values for each of the pixels from the reference image to the corresponding image values produced by the other cameras 12, 18. The search is performed along the epipolar lines which the reference pixel maps to in the other images. However, computational time is reduced by limiting the search to a fixed small distance on either side of each possible match. If a matching point is found in the other images, the predicted depth position is obtained by averaging all of the match points together. The match points can be weighted according to the length of the baseline distance between the reference camera and each of the cameras with the cameras furthest away carrying the greatest weight. If no match is found, the possible match found in image 14' is rejected. The output of step 46 is a refined collection of possible matches.

In performing step 46, it is assumed that each point in the image has the same appearance in all cameras. That is referred to as the Lambertian objects assumption (essentially, assuming that all world surfaces are slightly rough like flat wall paint, which is an almost universal assumption in stereo vision). Recently, it has been shown that it is possible to extend stereo vision to include the case of specular (glossy) objects by detecting and eliminating from consideration the highlights on the object. It is anticipated that that approach can be applied to the method of the present invention to allow for the recognition of a wider range of object surfaces.

In the current embodiment, a search distance of 15 millimeters is used. Typically, the false matches are reduced only slightly (from 4 or 5 false matches per reference pixel to 3 to 4 false matches per reference pixel) but the accuracy of the data is greatly improved. The time for step 46 is on the order of $D*N_2*U$ where D is the number of cameras in the distance set (two in the embodiment shown in FIG. 4), N is the image resolution, and U is the number of possible matches for a pixel remaining from the first step. Pseudo-code for carrying out step 46 is illustrated in Table 2.

TABLE NO. 2

At the start of the verify step, a list of possible matches for each pixel, x, in the reference image has been created.
That list is called Points_list(x).
for each pixel, x, in the reference image
    {
    for each 3D point, $P_j$, in Points_lists(x)
        {
        1.   Find two 3D points (Start_pt, End_pt), which lie on the line from the reference camera optical center to x and which are +−15mm from $P_j$.
        2.   Points_camera 12 = Find_possible_3D points (12, Start_pt, End_pt, intensity (1,x))
        3.   If Points_camera 12 is not empty:
            {
            1.   If Points_camera 18 = Find_possible_3D_points (18, Start_pt, End_pt, intensity (1,x))
            2.   If Points_camera 18 is not empty:
                {
                1.   For every point $Q_j$ in Points_camera 12 and $R_j$ in Points_camera 18
                    {
                    If $Q_j$ and $R_j$ are less than 5mm from each other
                        {
                        1.   G=the average of the three points $P_j$, $Q_j$, $R_j$, them according to baseline length between camera pairs.
                        2.   Add G to the possible good points list Possible_good_pts(x)

It should be noted that pseudo-code illustrated in Table 2 assumes using two cameras, cameras 12, 18, for verification. In the general case, the verification step 26 would be repeated as many times as necessary if additional cameras are available to provide additional two-dimensional images.

Figure 10:
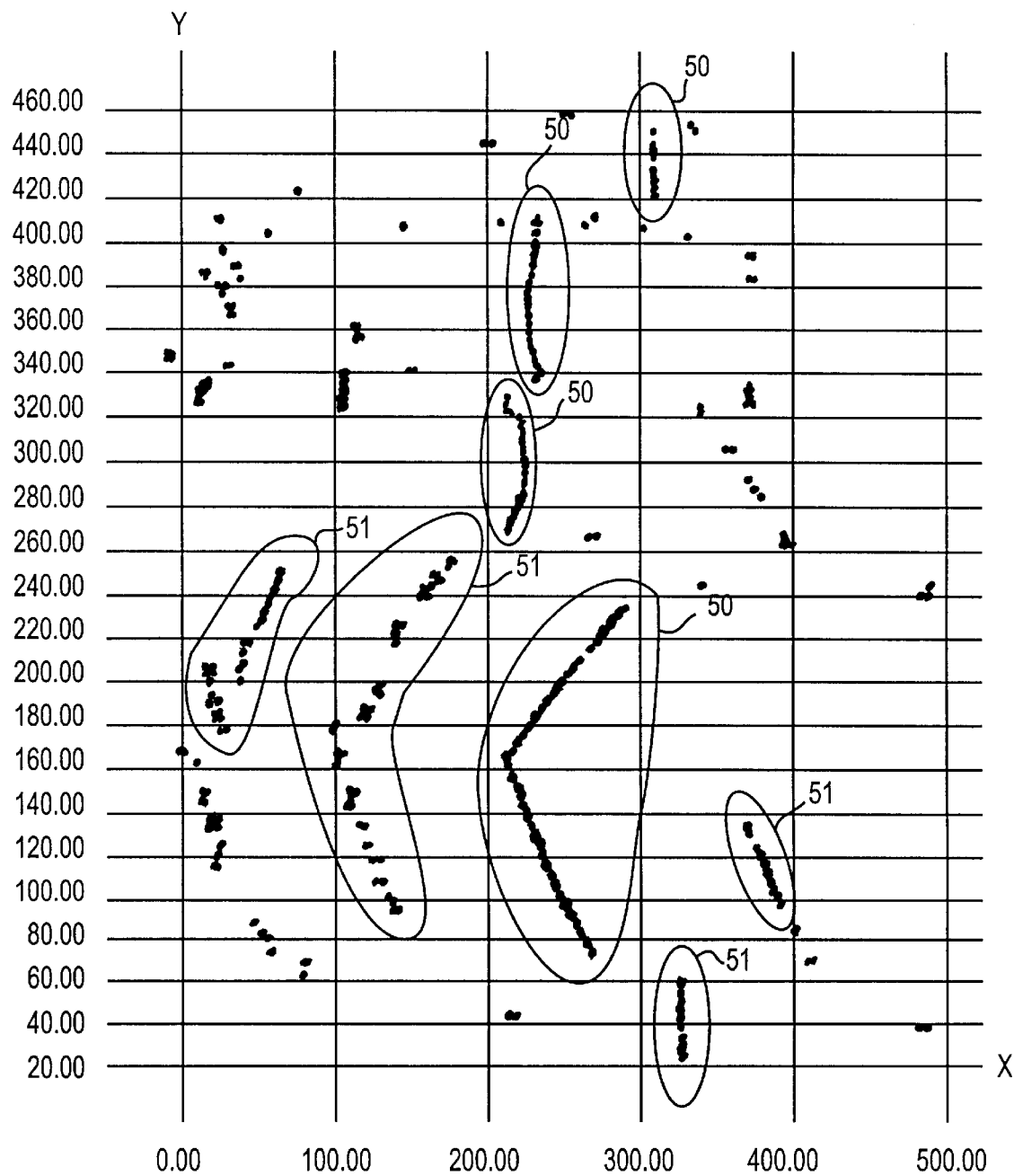
FIG. 10 illustrates points grouped into regions.

The next step, step 48, is to connect the points into regions. If a slice were to be made through the workspace at this time, at a constant height, groups of points would be visible as shown in FIG. 10. The filtering steps so far have not eliminated true points from the actual object's surfaces, and they have also not eliminated all false points. That is particularly true in the case of a repetitive texture where "echoes" at depths offset from the true surface are seen. Discontinuities in the true surfaces and object boundaries are also visible. To identify the true surfaces, the assumption that the objects in the scene are opaque is applied. It is now determined which points may belong to the same opaque regions. That is carried out by considering nearby pixels in the reference image 16'. The matches for nearby three-dimensional points may belong to the same regions if, in all images from all cameras, their projections occur in the same order in the images, and their projections are never too far apart in any of images. The requirement may also be imposed that they be in roughly the same position in depth. Points which meet those criteria are encircled within ovals 50 and 51 in FIG. 10. By determining equivalent classes of points under those criteria, connected regions of points in three-dimensional space are extracted. In the current embodiment, typically at this point we have hundreds of regions, the largest with tens of thousands of points. Pseudo-code for carrying out step 48 is illustrated in Table No. 3.

TABLE NO. 3

The connection step takes the list of possible good points from the
previous step and creates a collection of regions. As above, the
pseudo-code below is designed for using two verification
cameras 12 and 18). In the general case, the test in step 5 would be
repeated for all verification cameras.
For each pixel, x, in the reference image
1. For each $P_j$ in Possible_good_pts(x)
   {
   1. N = Union of Possible_good_pts(each pixel y in
      the neighborhood of x)
   2. for each $Q_k$ in N
      {
      1. $p12_j$ = projection of $P_j$ onto image 12'
      2. $p18_j$ = projection of $P_j$ onto image 18'
      3. $q12_k$ = projection of $Q_j$ onto image 12'
      4. $q18_k$ = projection of $Q_j$ onto image 18'
      5. If ($P_j$ and $Q_j$ are less than 5mm from each other) and
         ($p12_j$ and $q12_k$ are less than 3
         pixels from each other) and ($p18_j$ and $q18_k$ are
         less than 3 pixels from each other)
         {
         1. Set $P_j$ and $Q_j$ to be in the same region.

In step 52, false regions (51 in FIG. 10) are removed. The largest region from the image is extracted and the reference pixels for which it accounts are marked. The next largest region is extracted, and a determination is made if the reference pixels from the next largest region overlap significantly with the pixels from the previous regions. If so, the next largest region is eliminated. Otherwise, it is added to the list of good regions (50 in FIG. 10). That process is repeated until the region size is quite small. In the current embodiment, we check for overlap of about 90% of the region size. A minimum region size is approximately 1,000 points.

The assumption underlying step 52 is that the surfaces are opaque. Because we have not eliminated any true points in the previous steps, the only errors that remain are false echoes. Those echoes can be reduced in size by including more cameras for use in conjunction with step 46 and step 48. With a sufficient number of cameras, all false echoes will be smaller than any true surface points. The remaining false echoes will be eliminated in step 52.

Pseudo-code illustrating the step 52 of removing false regions is illustrated in Table No. 4.

TABLE NO. 4

1. R = the set of regions.
2. MIN_REGION_SIZE = the minimum region population
3. While the largest region in R is greater than MIN_REGION_SIZE
   {
   1. L = The region with largest population in R.
   2. For each 3D point $P_j$ in L
      {
      1. (u,v) = projection of $P_j$ onto reference image.
      2. If (u,v) is not occupied by another region
         {
         1. Points_not_taken + Points_not_taken +1.
         }
      }
   3. If (Points_not_taken)/(total population of region L) > 0.9
      {
      1. Declare the region L a good region.
      2. For every 3D point, $P_j$ in L.
         {
         1. (u,v) = projection of $P_j$ onto reference image.
         2. If (u,v) is not occupied by another region
            {
            1. Declare (u,v) to be in region L.
            2. Add $P_j$ to list of good points,
               Good_points.

At the conclusion of step 52, depth values for most of the image have been estimated. It is possible that some image pixels will not have any depth value because they are near object boundaries and the like. Furthermore, because the method of the present invention is very conservative with respect to the matching process, there are many points for which there is no estimated depth value. However, because the true depth values for much of the surface have been determined, that information can be used to locate more points using an interpolation-based method.

Figure 11:
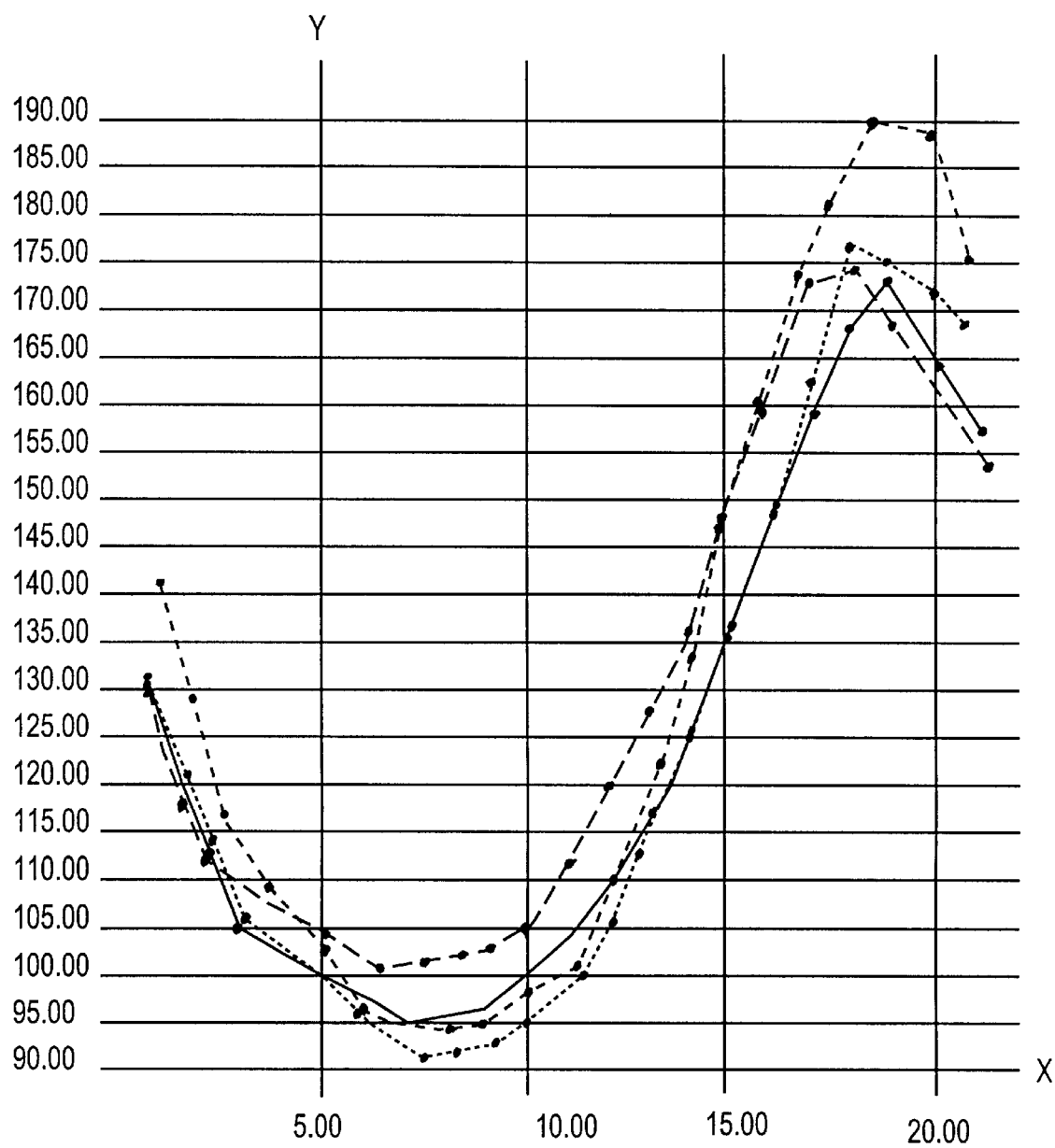
FIGS. 11 and 12 illustrate the normalization process.
Figure 12:
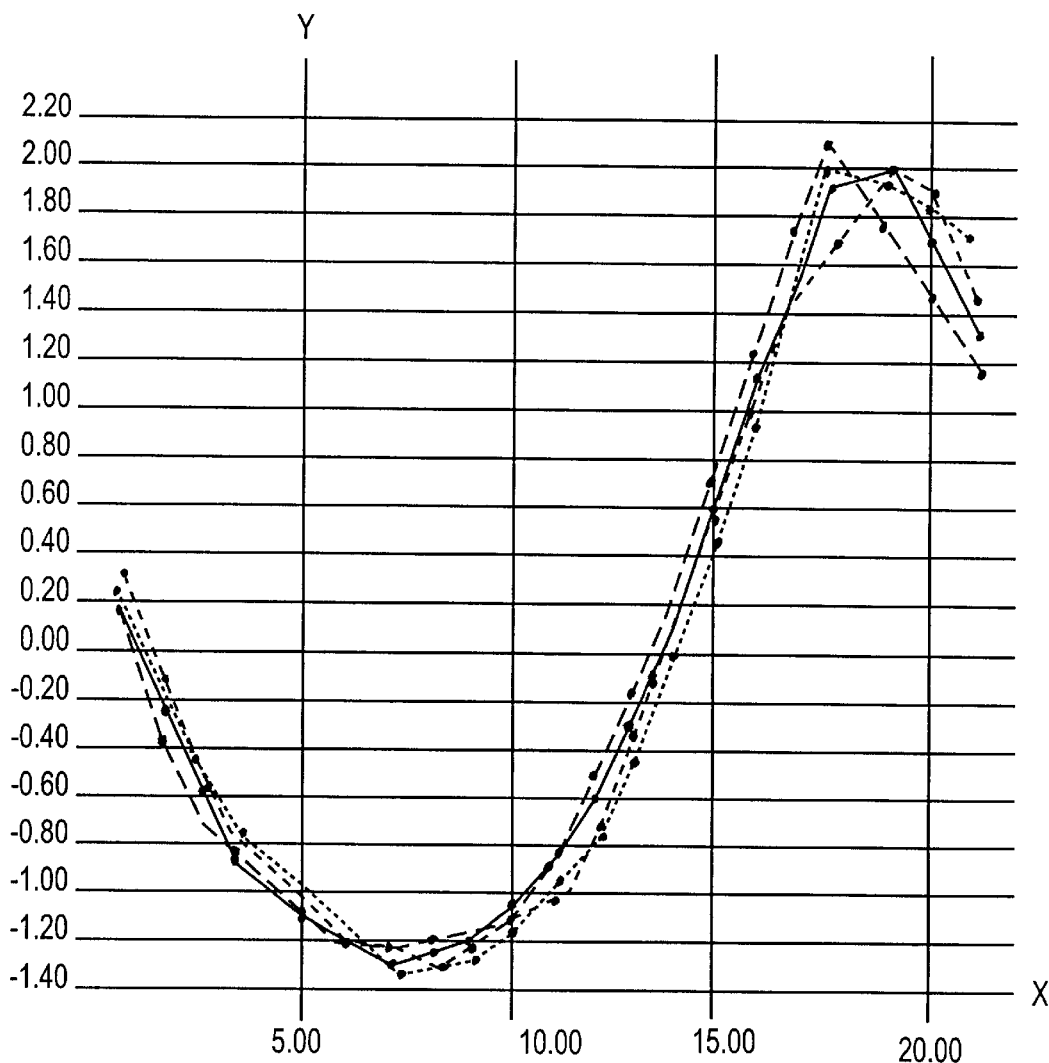

The last step of the process is a post-normalization step 54. Now that matches have been computed for many of the image points in the reference image, the true underlying image values can be approximated more exactly by calculating the average and standard deviation of the image values around the projection of each match. The image values in all images are adjusted to equalize the average and standard deviation. That process is shown graphically in FIGS. 11 and 12 where FIG. 11 illustrates a first iteration and FIG. 12 a second iteration. Thereafter, the process may be repeated by returning to step 38. Upon returning to step 38, with the adjusted image values, more match points will be found, and the matches will be found more accurately. Currently, point-normalization is performed only once and upon the second iteration through the process, the process ends at step 52 where the false regions are removed. The window for normalization is quite small (3×5 pixels) because we known that the intensity variation from the pattern dominates other variations in the image.

The present invention represents several substantial advances over the art. First, by connecting points into regions, and making decisions based on regions, the ability to recreate a three-dimensional image of the original object with high fidelity is greatly enhanced. Additionally, at a number of places in the method, steps are made to reduce the computational time which is required. For example, by beginning with two cameras which are close together, and searching the epipolar line in the image space rather than the workspace, computational time is reduced. Thereafter, that information is used to limit the amount of searching which must be done with respect to images from cameras further away from the reference camera, which therefore have longer epipolar lines. Such techniques greatly reduce the computational resources which are required thereby allowing the method of the present invention to be practiced on commercially available hardware in time frames on the order of minutes.

Those of ordinary skill in the art will recognize that many modifications and variations of the present invention are possible. For example, the steps of finding possible matches and the location of regions in three-dimensional space need not be performed as described herein. The method of the present invention works equally well with other methods of finding possible matches. All such modifications and variations are intended to fall within the spirit and scope of the foregoing description and the following claims.

What is claimed is:

1. A method of constructing a three-dimensional image from at least two, two-dimensional images, comprising the steps of:
   selecting one of the images to be a reference image;
   identifying one or more points in another image as match points for each of multiple points in the reference image;
   projecting the match points into space including three spatial dimensions;
   grouping the projected match points into three-dimensional regions;
   projecting said regions onto the reference image to identify false regions;

eliminating said false regions; and constructing a three-dimensional image by adding the regions which are not false regions.

2. The method of claim 1 including the step of normalizing the points in the images and repeating the method.

3. The method of claim 1 wherein said step of identifying one or more match points includes the step of searching along an epipolar line in the other image corresponding to a point in the reference image for which a match is sought.

4. The method of claim 1 additionally comprising the step of identifying first points in a workspace where rays extending through the point in the reference image intersect with rays extending through the match points.

5. The method of claim 4 wherein a third two-dimensional image is available, said method additionally comprising the steps of identifying one or more points in the third image as match points for each point in the reference image, identifying second points in a workspace where rays extending through the point in the reference image intersect with rays extending through the match points, and combining said first and second points.

6. The method of claim 5 wherein said step of identifying one or more points in the third image includes the step of searching along an epipolar line in the third image corresponding to a point in the reference image for which a match is sought in a search area limited by the match point from the other image.

7. The method of claim 6 wherein the search area is limited to approximately 15 mm on either side of the other image's match point's positions on the epipolar line of the third image.

8. The method of claim 1 wherein said step of grouping the projected match points into regions includes grouping the projected match points according to their spacing and order in each image.

9. The method of claim 8 wherein said step of grouping includes grouping according to a spacing of approximately 5 mm.

10. The method of claim 8 wherein said step of grouping includes grouping the projected match points according to their respective depths.

11. The method of claim 1 wherein said step of identifying said false regions includes the steps of (i) selecting the largest region and marking the points on the reference image accounted for by the largest region, (ii) selecting the next largest region and marking the points on the reference image accounted for by the next largest region, (iii) identifying the next largest region as a false region if the degree of overlap between the marked points is above a predetermined threshold, and (iv) repeating steps (ii) through (iv) until all the regions greater than a predetermined size have been selected.

12. The method of claim 11 wherein said step of identifying the next largest region as a false region includes identifying the next largest region as a false region if the degree of overlap is at least approximately ten percent.

13. The method of claim 11 wherein steps (ii) through (iv) are repeated until all regions having more than approximately one thousand points have been selected.

14. A method of constructing a three-dimensional image from a plurality of two-dimensional images, comprising the steps of:

selecting one of the images to be a reference image;

selecting a second image;

identifying one or more points in the second image as match points for each of multiple points in the reference image;

projecting the match points into space including three spatial dimensions;

using the remainder of the plurality of images to verify the match points;

grouping the projected and verified match points into three-dimensional regions;

projecting said regions onto the reference image to identify and eliminate false regions; and constructing a three-dimensional image by adding the regions which are not false regions.

15. The method of claim 14 wherein said step of selecting a second image includes the step of selecting the image which has the shortest baseline with respect to the reference image.

16. The method of claim 14 wherein said step of using the remainder of the plurality of images to verify the match points includes the steps of searching the epipolar lines in each of the remaining images in the areas of the match points and eliminating any match point for which an additional match cannot be found along the portion of the epipolar line searched.

17. The method of claim 14 including the step of normalizing the points in the images and repeating the method.

18. The method of claim 14 additionally comprising the steps of projecting a pattern onto a three-dimensional object and producing the plurality of two-dimensional images of the three-dimensional object.

19. The method of claim 18 additionally comprising the step of using the information from the pattern found in each of the two-dimensional images to normalize the intensity of the plurality of images.

20. The method according to claim 14, wherein said step of identifying comprises the step of identifying one or more points in the second image as possible match points for each point in the reference image.

21. The method according to claim 1, wherein said step of identifying comprises the step of identifying one or more points in the second image as match points for each point in the reference image.

* * * * *